(12) United States Patent
Bijlholt

(10) Patent No.: US 9,038,877 B2
(45) Date of Patent: May 26, 2015

(54) DEVICE FOR HOLDING A PORTABLE ELECTRONIC DEVICE

(71) Applicant: Faurecia Innenraum Systeme GmbH, Hagenbach (DE)

(72) Inventor: Joep Bijlholt, Wissembourg (FR)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/246,552

(22) Filed: Apr. 7, 2014

(65) Prior Publication Data

US 2014/0305981 A1 Oct. 16, 2014

(30) Foreign Application Priority Data

Apr. 15, 2013 (DE) .......................... 10 2013 206 692

(51) Int. Cl.
*B60R 11/02* (2006.01)
*F16M 11/04* (2006.01)
*F16M 13/00* (2006.01)
*B60R 11/00* (2006.01)
*H04M 1/04* (2006.01)

(52) U.S. Cl.
CPC ......... *B60R 11/02* (2013.01); *B60R 2011/0075* (2013.01); *F16M 11/041* (2013.01); *F16M 13/00* (2013.01); *H04M 1/04* (2013.01); *F16M 2200/02* (2013.01)

(58) Field of Classification Search
CPC .............. B60R 2011/0005; B60R 2011/0008; B60R 2011/001; B60R 2011/0075
USPC ......... 224/446, 456, 461–462, 536, 552–554, 224/42.38, 570, 929; 248/451–452, 316.1, 248/316.4, 316.5
See application file for complete search history.

(56) References Cited

U.S. PATENT DOCUMENTS

| | | | | | |
|---|---|---|---|---|---|
| 5,836,563 | A | * | 11/1998 | Hsin-Yung | .................. 248/316.4 |
| 6,959,899 | B2 | * | 11/2005 | Yeh | ........................... 248/346.03 |
| 2007/0284500 | A1 | * | 12/2007 | Fan | ........................... 248/346.06 |

(Continued)

FOREIGN PATENT DOCUMENTS

| | | | |
|---|---|---|---|
| DE | 202012003628 U1 * | 9/2012 | |
| EP | 2325049 A1 | 5/2011 | |

OTHER PUBLICATIONS

German Office Action and translation for corresponding DE Patent Application No. DE102013206692.9, dated Apr. 7, 2014.

*Primary Examiner* — Justin Larson
*Assistant Examiner* — Scott McNurlen
(74) *Attorney, Agent, or Firm* — Timothy X. Gibson, Esq.; Gibson & Dermier LLP

(57) ABSTRACT

An apparatus for detachably holding a portable electronic device, the apparatus including a receiving part for the device and closure means, the receiving part including a base for supporting the device, wherein the closure means is movably mounted relative to the receiving part, the closure means including a lever and fixing element, the fixing element arranged on a side of the receiving part opposite the base, the fixing element designed to exert a holding force in the direction of the base onto the device to be held, the lever mounted rotatably on the fixing element via a first swivel pin, the apparatus further including a holding element fixed to the receiving part, a locking element coupled to the lever, and a stop for the locking element, the locking element designed to block the movement of the closure means relative to the receiving part and release movement of the closure means.

17 Claims, 3 Drawing Sheets

(56) References Cited

U.S. PATENT DOCUMENTS

| | | |
|---|---|---|
| 2008/0296821 A1 | 12/2008 | Carnevali |
| 2012/0104195 A1* | 5/2012 | Da Costa Pito et al. ... 248/205.1 |
| 2012/0120626 A1* | 5/2012 | Akaike ............. 361/807 |
| 2013/0148273 A1* | 6/2013 | Tsai ............. 361/679.01 |
| 2014/0192482 A1* | 7/2014 | Lin ............. 361/679.55 |

* cited by examiner

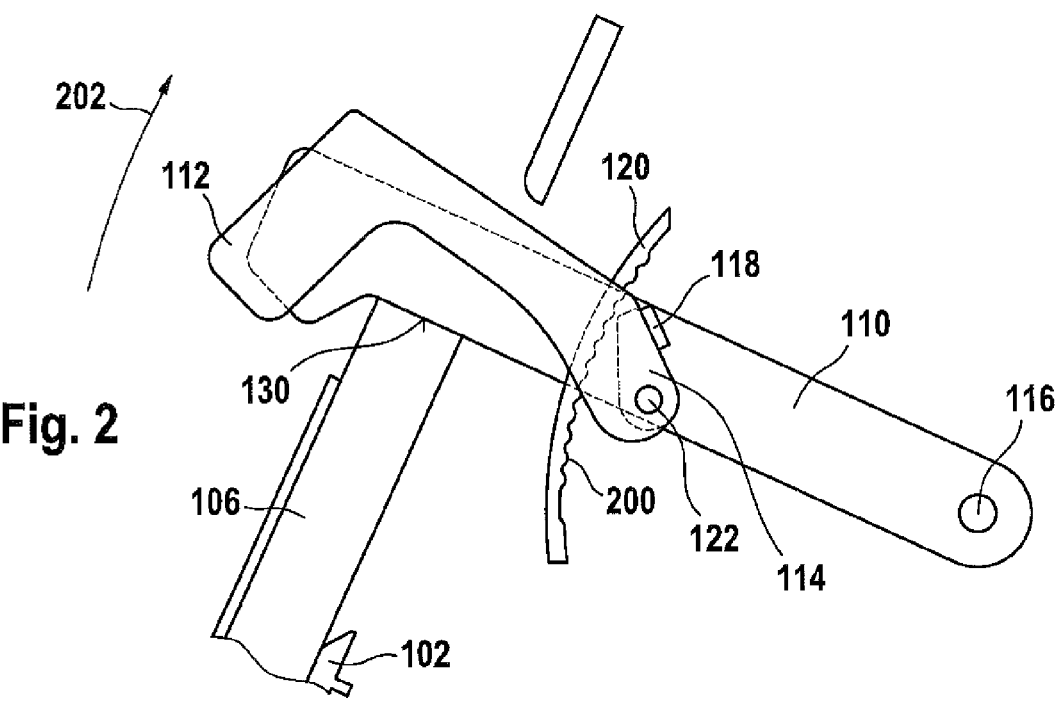
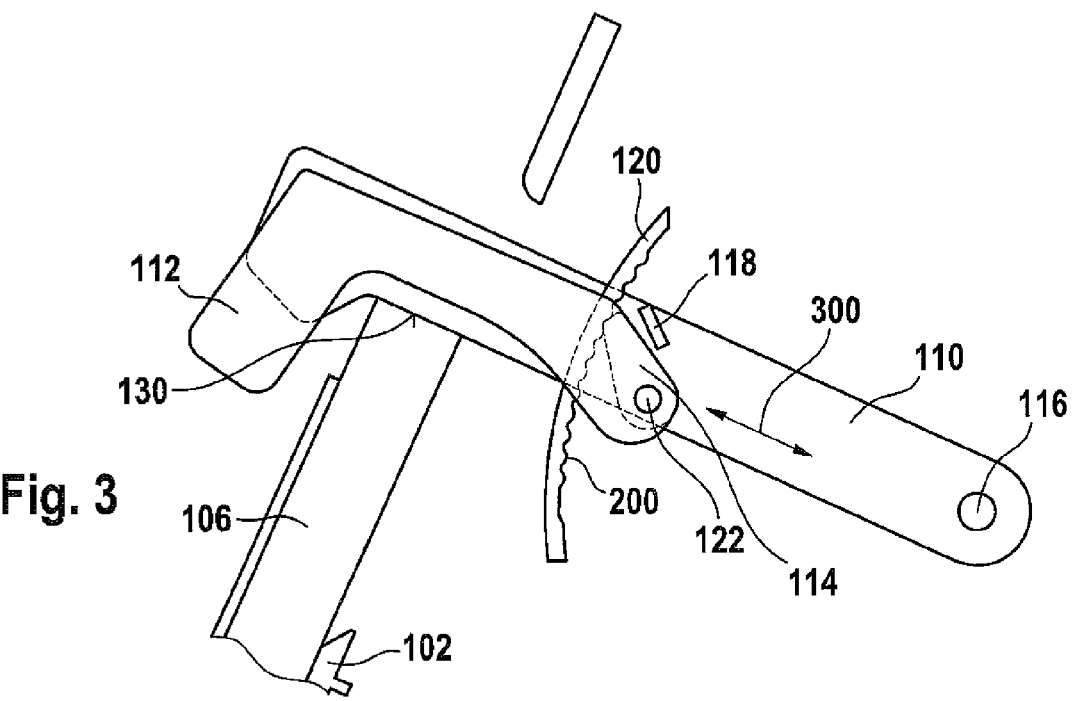

DEVICE FOR HOLDING A PORTABLE ELECTRONIC DEVICE

BACKGROUND

The invention relates to a device for detachably holding a portable electronic device.

Portable electronic devices, such as mobile telephones, personal digital assistances (PDAs), navigation devices, music players (MP3 players, video players) have to be housed in means of transportation, such as motor vehicles, so that they cannot independently fly around within the vehicle during normal travel and in particular in the event of a crash. Devices that are flying around present a high risk of injury for the vehicle driver and other vehicle passengers.

For example, US 20080296821 A1 discloses a holding apparatus for devices. A further holding apparatus for mobile telephones is known from EP 2 325 049 A1.

SUMMARY OF THE INVENTION

The object of the invention is to create an improved apparatus for detachably holding a portable electronic device.

The object forming the basis of the invention is achieved by the features of the one or more embodiments disclosed and/or described herein.

An apparatus for detachably holding a portable electronic device is specified, wherein the apparatus comprises a receiving part for the device and a closure means, wherein the receiving part has a base for supporting the device. The closure means is mounted so is to be movable relative to the receiving part, wherein the closure means comprises a lever and a fixing element. The fixing element is arranged on a side of the receiving part opposite the base, wherein the fixing element is designed to exert a holding force in the direction of the base onto the device to be held. The lever is in turn mounted rotatably on the fixing element via a first swivel pin, wherein the apparatus further comprises a holding element fixed to the receiving part, a locking element coupled to the lever, and a rigid stop, for the locking element, said stop being connected to the fixing element. The locking element is designed, when distanced from the stop, to block the movement of the closure means relative to the receiving part as a result of engagement with the holding element, and, when resting against the stop, to release the movement of the closure means in a direction away from the base.

Embodiments of the invention could have the advantage that, in the closed position of the lever, that is to say in the position in which the locking element is distanced from the stop, the device is pressed against the base via the fixing element or is at least secured against an unintentional independent removal from the base. The portable electronic device is thus fixedly connected to the apparatus in the closed position of the lever.

In order to then remove the device again from the apparatus, it is sufficient to actuate the lever and in so doing to move the locking element against the stop. The movability of the closure means in a direction away from the base is thus released, and the blocking of the device by the fixing element is cancelled. This means that the portable electronic device can now be easily removed from the apparatus.

On the whole, simple operability of the apparatus for inserting and fixing the electronic device and also for releasing the fixing of and removing the electronic device could be produced here. Due to the described lever mechanism, in which the lever is mounted rotatably on the fixing element by the first swivel pin, it is possible to reversibly implement an independent fixing of the device via the fixing element with low application of force. The application of force necessary for this purpose may be lower here than the force with which the movement of the closure means relative to the receiving part is blocked. It could thus be possible to provide a very secure fixing of the electronic device in the apparatus in a simple manner, which ensures that the device is not removed independently from the apparatus, even at high accelerations, as occur for example in the event of a crash.

In accordance with an embodiment of the invention the apparatus further comprises a first spring on the fixing element, wherein the first spring is designed to exert a retrieving force onto the fixing element in the direction of the base. This could have the advantage that, once the lever has been released, the closing process of the fixing element is triggered independently with an independent movement of the fixing element toward the upper face of the portable electronic device. This could simplify the operation of the apparatus considerably. It is therefore unnecessary to additionally force the fixing element in the direction of the base by means of an exertion of force onto the fixing element.

In accordance with an embodiment of the invention the spring is arranged between the fixing element and the receiving part.

In accordance with an embodiment of the invention the locking element is rigidly connected to the lever. This could have the advantage that a particularly high service life could be ensured due to a minimisation of the movable components of the apparatus. A further advantage could be that the blocking forces against the movement of the closure means relative to the receiving part can be maximised, said blocking forces being achieved by the locking element due to engagement with the holding element. In extreme cases, there is no undesired movement between the locking element and holding element.

In accordance with an alternative embodiment of the invention the locking element is acted on by a spring force via a second spring, wherein the second spring is designed to exert a retrieving force onto the locking element in the direction of the holding element. For example, this could be achieved by designing the second spring to exert the retrieving force onto the locking element in the direction of the holding element via a torque. In an additional or alternative variant it is possible for the retrieving force on the locking element in the direction of the holding element to be produced via a translation of the second spring in the direction of the holding element. This could have the advantage that the transfer of the locking element for engagement with the holding element is "cushioned". For example, there is thus no abrupt build-up of force here, which a user of the apparatus discovers when transferring the lever into the closed position as the "response" of the apparatus to the relative movement of the locking element and holding element.

In accordance with an embodiment of the invention the movable mounting of the closure means relative to the receiving part is provided via a second swivel pin, wherein the second swivel pin is designed to guide a rotary movement of the closure means relative to the receiving part. This could have the advantage that a high service life of the apparatus could be provided due to the simplicity of the attachment of the closure means relative to the receiving part via a swivel pin. For example, the second swivel pin is mounted on the apparatus in a manner fixed to the receiving part.

Alternatively or additionally, the movable mounting of the closure means relative to the receiving part could be provided via a guide element, wherein the guide element is designed to guide a movement in translation of the closure means relative to the receiving part. The fact that a movement in translation is enabled could have the advantage that the spatial requirement in the direction away from the base of the apparatus is minimised in order to insert a device into the apparatus. In the case of a pivoting motion, the spatial requirement of the apparatus is usually greater due to the lever.

In accordance with an embodiment of the invention the locking element and the holding elements comprise mating detent elements, wherein the detent elements are formed in order to enable the blocking of the movement of the closure means in the direction away from the base by means of a mutual latched engagement of the detent elements. Here, the mating detent elements are preferably designed to release a movement of the closure means in the direction towards the base. The use of detent elements could have the advantage that a fixing of the electronic device by the apparatus could then thus be ensured even if high forces act on the device and the apparatus. If the mating detent elements are dimensioned so as to be correspondingly large, practically any forces could be taken up without resulting in an "unlatching" of the mating detent elements.

The mating detent elements are further preferably designed as pawls. When closing the lever, that is to say when pressing the lever in the direction of the base of the apparatus, the mating detent elements can therefore "ratchet" over one another insteps. The pivoting motion of the lever is thus enabled if the lever is moved in the direction of the base, whereas a movement of the detent elements in the opposite direction is automatically blocked.

Alternatively, it is possible for the mating detent elements to be designed as spring-loaded stepped lips.

In accordance with a further embodiment of the invention the locking element and the holding element comprise mating frictional surfaces, wherein the movement of the closure means in the direction away from the base is blocked by a static friction between the frictional surfaces. This could have the advantage that a continuous adjustment of the position of the fixing element is thus possible via the lever. Electronic devices of a wide range of sizes can thus be held in a universal apparatus.

In accordance with a further embodiment of the invention the holding element is curved. Alternatively, the holding element is straight and uncurved.

In accordance with a further embodiment of the invention the apparatus further comprises a trigger on the receiving part, wherein the trigger is mechanically coupled to the closure means via a coupling. The coupling is designed here such that
the movability of the closure means relative to the receiving part is released upon actuation of the trigger by the device to be received in the receiving part, and
the movability of the closure means relative to the receiving part is blocked when the trigger is released by the device to be received.

The use of a trigger ensures that, in the case in which the receptacle is free of the device to be received, the fixing element is held in its open position. The fixing element therefore is not urged into a closing position as a result of the force of gravity or due to a restoring force resulting from a return spring, and it could only be possible with difficulty to insert the device into the receiving part. On the whole, one-handed operation of the apparatus could therefore be possible.

In accordance with an embodiment of the invention the coupling comprises a latch and a lock bolt formed in a manner complementary to the latch, wherein
the latch is arranged rotatably on the closure means and the lock bolt is arranged on the apparatus in a manner fixed to the receiving part, or
the latch is arranged rigidly on the closure means and the lock bolt is arranged rotatably on the apparatus.

The combination of latch and lock bolt ensures that the movability of the closure means relative to the receiving part can be blocked or released in a mechanically simple and yet reliable manner independently of the restoring forces (caused by gravity or spring force) acting on the fixing element.

In accordance with an embodiment of the invention the latch or the lock bolt has a chamfer, wherein the chamfer is designed to transfer the latch into the lock bolt in the event of movement of the closure means in the direction away from the base.

In accordance with an embodiment of the invention the trigger is arranged rotatably on the receiving part, wherein the trigger is designed, in the event of actuation of the trigger by the device to be received in the receiving part, to exert a force onto the latch or the lock bolt, such that the latch can be removed from the lock bolt as a result of the force. This could have the advantage that the mobile telephone can be inserted smoothly into the receiving part with use of a rotary movement due to the rotatably mounted trigger by application of a small force to the trigger in order to thus release the movability of the closure means relative to the receiving part.

It is noted that the above-described embodiments of the invention can be combined with one another arbitrarily, provided the combined embodiments are not mutually exclusive.

BRIEF DESCRIPTION OF THE DRAWINGS

Preferred embodiments of the invention will be explained in greater detail hereinafter on the basis of the drawings, in which:

FIG. 2 shows a detailed view of FIG. 1, FIG. 3 shows a further detailed view of FIG. 1.

DETAILED DESCRIPTION OF THE INVENTION

Similar elements will be denoted hereinafter by like reference signs.

Figure 1:
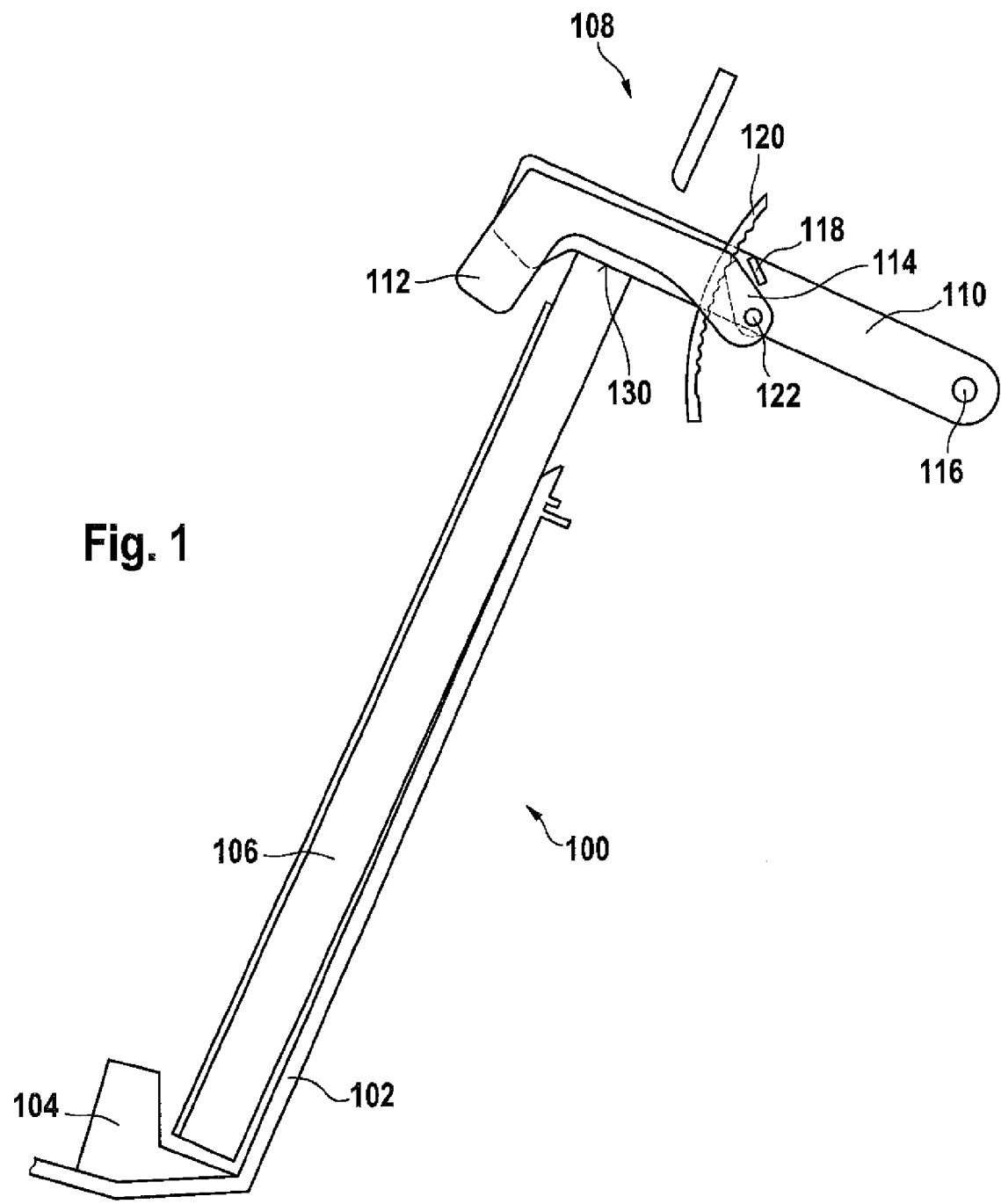
FIG. 1 shows a view of an apparatus for detachably holding a portable electronic device.

FIG. 1 shows an apparatus 100 for detachably holding a portable electronic device 106, such as a mobile telephone. The apparatus 100 comprises a receiving part 102, which can be fastened to the motor vehicle via fastening means (not shown in greater detail), such as a suction cup. The receiving part 102 has a base 104 for supporting the mobile telephone 106.

In order to now fix the mobile telephone 106 in the receiving part 102, it is necessary to block the mobile telephone 106 at the upper face thereof upwardly in the direction from the base 104. This is achieved in accordance with the apparatus 100 described in FIG. 1 by a fixing element 110. The fixing element 110 contacts the telephone 106 in the region of the contact area 130 of the upper face of the telephone 106 and pushes the telephone optionally in the direction of the base 104. The telephone is thus secured from falling out of the apparatus 100.

The apparatus 100 further comprises a closure means 108, which comprises the fixing element 110 inter alia. The closure means 108 further also comprises a lever 112. In the embodiment in FIG. 1, a locking element 114 is arranged rigidly on the lever 112. The lever 112 can be rotated along with the locking element 114 about a swivel pin 122, wherein the swivel pin 122 is mounted on the fixing element 110.

Whereas FIG. 1 and the associated detailed view in FIG. 3 show the state of the apparatus in which the lever 112 is located in the closed position, the lever in the view in FIG. 2 has been pivoted in the direction 202, that is to say away from the base 104, by a rotary movement about the pin 122. As can be seen in FIG. 2, this pivoting motion of the lever 112 in the direction 202 also inevitably leads to a corresponding pivoting motion of the locking element 114 in the direction 202. This, however, causes the locking element 114 to contact a stop 118 once said locking element 114 has travelled over a specific predefined pivot path. The stop 118 is rigidly connected to the fixing element 110.

It is now assumed that the lever 112 is moved further in the direction 202, thus causing a force to be exerted onto the stop 118, likewise in the direction 202, via the lever 112 and therefore via the locking element 122. This causes the fixing element 110 to also be moved at the same time in the direction 202 via the lever 112. The reason for this is that the fixing element 110 is mounted on the apparatus about a pivot pin 116.

On the whole, the fixing element 110 is thus moved away from the telephone 106 in the direction 202 as a result of the movement of the lever 112 in the direction 202. This means that the telephone 106 is released in the receiving part for removal.

In order to now ensure that the telephone 106 is also held permanently by the fixing element in the closed position of the lever 112 shown in FIGS. 1 and 3, the apparatus 100 further comprises a holding element 120 fixed to the receiving part. The locking element 114 is designed, at a distance from the stop 118, to block the movement of the closure means 108 relative to the receiving part 102 as a result of engagement with the holding element 120. In the event however that the locking element 114 rests against the stop 118, a movement of the closure means 108 in a direction away from the base 104 is indicated.

To this end, the locking element 114 and the holding element 120 comprise mating detent elements, wherein the detent elements are formed such that it is possible to block the movement of the closure means in the direction away from the base as a result of a mutual latched engagement of the detent elements. As can be seen in FIGS. 2 and 3, the detent elements of the holding element 120 comprise pawls for this purpose. As a result, the locking element ratchets in steps over the pawls 200 of the holding element as the lever 112 is transferred in a direction towards the base 104 (that is to say against the direction 202). It is ensured in each relative position between the individual pawls and the locking element that the locking element can no longer move independently from the respective locking angle. This is possible if the lever 112 is in turn rotated in the direction 202.

As is shown in FIG. 3, the mutual engagement of locking element and holding element could result in the challenge that a further movement of the fixing element 110 against the direction 202 is severely impaired. To this end, the elevations of the surface of the holding element, these being shaped in a regular manner by the pawls 200, would have to be passed over in stages by the locking element 114.

In order to simplify this for a user of the apparatus 100, the locking element 114 could be acted on by a spring force for example, wherein this spring force causes a torque on the locking element, as considered in relation to the pin 122. Alternatively or additionally, it is possible to act on the pawl 114 or the holding element 120 with a spring force such that these are urged toward one another and, due to the pawl shape of the detent elements, can be easily urged from one another in the event of the movement against the direction 202. The locking element and holding element are thus drawn toward one another by the spring, and the holding force of the locking element in the holding element is not only ensured exclusively by the pawls, but additionally also via the spring force acting between the locking element and the holding element.

It is noted that it is possible, alternatively or additionally to the use of detent elements for example in the form of pawls, for the locking element 114 and the holding element 120 to have mating frictional surfaces, wherein, due to a static friction between these frictional surfaces, a movement of the closure means 108 is then blocked if the lever is located in the position shown in FIG. 1 or 2. The latter could have the advantage that a continuous adjustment of the position of the fixing element 110 relative to the receptacle 102 is possible.

Figure 4:
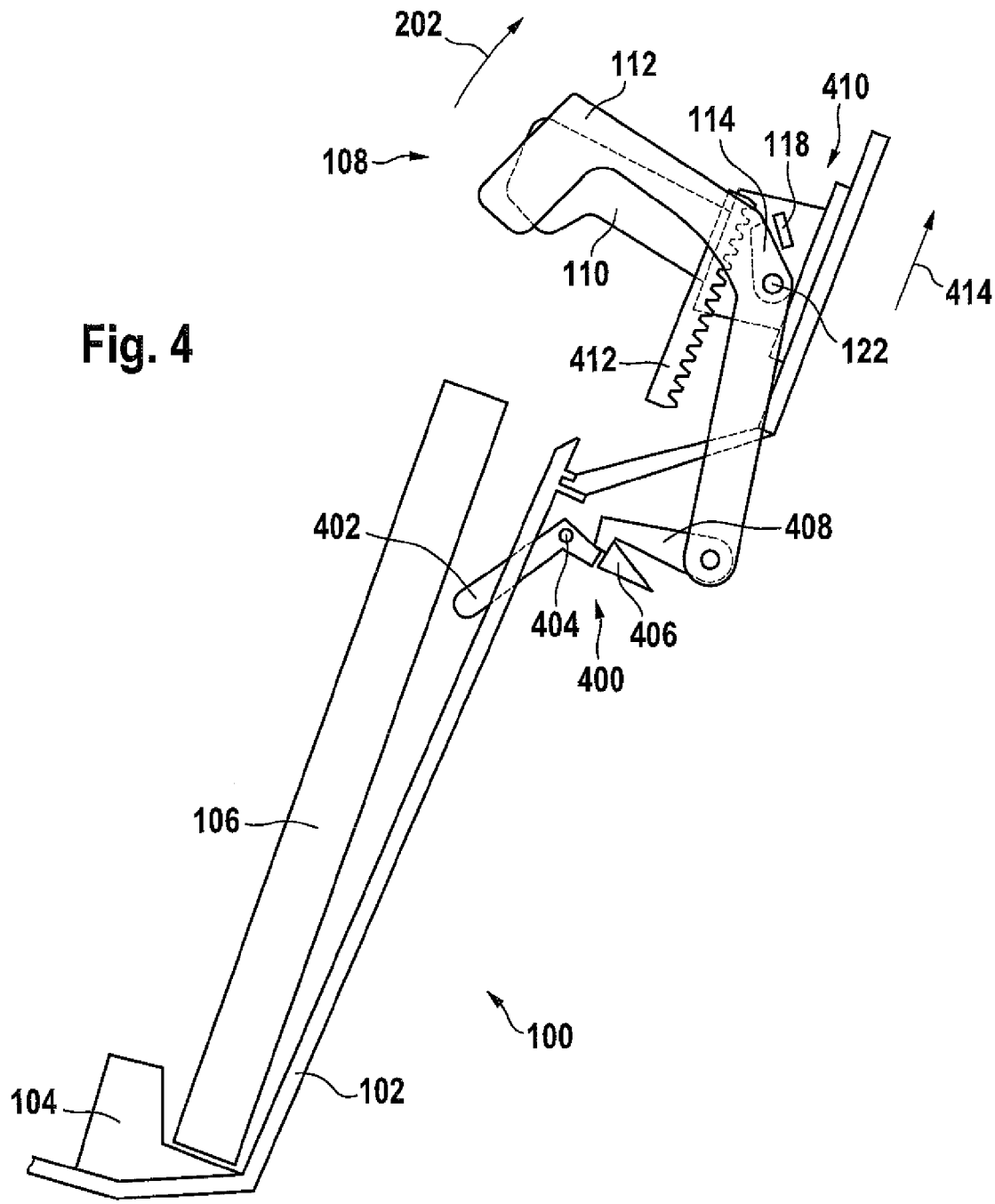
FIG. 4 shows an alternative variant of an apparatus for detachably holding a portable electronic device.

FIG. 4 shows an alternative embodiment compared with FIGS. 1 to 3. The main difference here is that, instead of a fixing element 110 mounted rotatably about the pin 116, a mounting in translation of the fixing element 110 is now provided. To this end, a guide element 410 is provided, which serves to guide a movement in translation of the closure means 108 relative to the receiving part 102. For example, this could be a type of sliding block guide, in which a mating link block of the closure means 108 is guided.

The advantage of a movement in translation is that the orientation of the fixing element relative to the telephone does not change and it is thus possible to achieve a larger adaptation range.

The operating principle of the apparatus shown in FIG. 4 is substantially identical to the operating principle of the apparatus in FIGS. 1 to 3. By moving the lever 112 in the direction 202, the locking element 114 is again removed from the holding element 412. Compared to the holding element 120, the holding element 412 is uncurved and straight, that is to say is oriented in the direction of the movement in translation enabled by the guide element 410 with respect to the closure means 108. Once the locking element has contacted the stop 114, the rotational movement in the direction 202 is converted into a movement in translation in the direction 414. The closure means 108 can thus be removed from the telephone 106 in the direction 414, and the telephone 106 can be removed from the receptacle 102.

In order to enable one-handed operation of the apparatus 100, a trigger 402 is arranged in FIG. 4 on the receiving part 102 and is connected rotatably to a pin 404. The trigger 402 is coupled to the closure means 108 via a coupling 400. If the telephone 106 is removed from the receptacle 102, the trigger 402 is thus located in the position shown in FIG. 4. In this position, it is ensured via the coupling 400 that a movement of the closure means 108 against the direction 414 in the direction of the base 104 is blocked. It is thus possible in the open position of the closure means, without any further manipulation of the closure means, in particular the lever 112, to again insert the telephone 106 into the apparatus.

When inserting telephone 106 into the receptacle 102, the lever 402 is now pressed downwardly and is thus moved in the direction of the receiving area of the receptacle 102. This leads to a rotational movement of the lever 402 about the pin 404.

The coupling 400 comprises a latch 408 mounted rotatably on the closure means, wherein a lock bolt 406 formed in a manner complementary to the latch 408 is additionally arranged on the apparatus 100 in a manner fixed to the receiving part. The lock bolt 406 has a chamfer, wherein the chamfer is designed to transfer the latch 408 into the lock bolt when the closure means 108 is moved in the direction 202. In other words, as the closure means moves in the direction 202 and a resultant rotational movement of the fixing element 110 is performed in the direction of the receptacle 202 about the pin 122, the hook-shaped latch falls into the lock bolt 406 since the hook-shaped latch 408 shifts upwardly along the chamfer of the lock bolt and then engages behind the lock bolt after falling thereinto. In this position, a movement of the latch directed backwards or even of the fixing element 110 is no longer possible. This movement is prevented by the fact that the latch and lock bolt engage in one another.

It is noted that a potential possibility for movement of the fixing element 110 against the direction 414 could result due to gravity or spring force, in particular if a spring force acts between the receiving part 102 and fixing element 110.

In the state shown in FIG. 4, the latch 408 is now thus located in the lock bolt 406. The end of the trigger 402 facing away from the telephone 106 to be received is located beneath the latch 408. For example, it is located beneath the hook which comprises the latch 408. If the telephone 106 is now inserted into the receptacle 102, the lever 402 is thus pushed to the right in the direction of the receptacle 102. Due to the rotatable mounting about the pin 404, this causes the end of the lever 402 facing away from the telephone 106 to be rotated upwardly in the direction 414. The latch 408 is thus lifted out from the lock bolt 406 and can shift in a freely movable manner along the chamfer of the lock bolt, likewise to the right in a downward direction. Any movability of the closure means is released in this state.

It should be noted at this juncture that the combination of trigger 402 and coupling 400 can also be used for the examples of apparatuses as have been shown in FIGS. 1 to 3.

It should be further noted that a spring which urges the fixing element 110 in the direction of the base 104 is preferably used in FIGS. 1 to 3. This facilitates the operability of the apparatus.

LIST OF REFERENCE SIGNS 100 apparatus
102 receptacle
104 base
106 telephone
108 closure means
110 fixing element
112 lever
114 locking element
116 pin
118 stop
120 holding element
122 pin
130 contact area
200 pawls
202 direction of rotation
300 direction of displacement
400 coupling
402 trigger
404 pin
406 lock bolt
408 latch
410 guide element
412 holding element
414 direction

The invention claimed is:

1. An apparatus for detachably holding a portable electronic device, wherein the apparatus comprises a receiving part for the device and a closure means, wherein the receiving part comprises a base for supporting the device, wherein the closure means is mounted so as to be movable relative to the receiving part, wherein the closure means comprises a lever and a fixing element, wherein the fixing element is arranged on a side of the receiving part opposite the base and movably mounted on the apparatus to permit movement of the fixing element upon movement of the lever away from the base, wherein the fixing element is configured and operable to exert a holding force in the direction of the base onto the device to be held, wherein the lever is mounted rotatably on the fixing element via a first swivel pin, wherein the apparatus further comprises a holding element fixed to the receiving part, a locking element coupled to the lever, and a stop for the locking element, said stop being rigidly connected to the fixing element, wherein the locking element is designed, at a distance from the stop, to block the movement of the closure means relative to the receiving part due to engagement with the holding element, and, when resting against the stop, to release the movement of the closure means in a direction away from the base, wherein movement of the lever in a direction away from the base is operable to exert a force on the stop in the same direction via the lever and via the locking element, causing the fixing element to also be moved in a direction away from the base.

2. The apparatus according to claim 1, further having a first spring on the fixing element, wherein the first spring is designed to exert a retrieving force onto the fixing element in the direction of the base.

3. The apparatus according to claim 2, wherein the spring is arranged between the fixing element and the receiving part.

4. The apparatus according to claim 1, wherein the locking element is rigidly connected to the lever.

5. The apparatus according to claim 1, wherein the locking element or the holding element is acted on by a spring force via a second spring, wherein the second spring is designed
    to exert a retrieving force onto the locking element in the direction of the holding element, or
    to exert a retrieving force onto the holding element in the direction of the locking element.

6. The apparatus according to claim 5, wherein the second spring is designed to exert the retrieving force onto the locking element in the direction of the holding element via a torque.

7. The apparatus according to claim 1, wherein the movable mounting of the closure means relative to the receiving part is provided via a second swivel pin, wherein the second swivel pin is designed to guide a rotational movement of the closure means relative to the receiving part.

8. The apparatus according to claim 1, wherein the movable mounting of the closure means relative to the receiving part is provided via a guide element, wherein the guide element is designed to guide a movement in translation of the closure means relative to the receiving part.

9. The apparatus according to claim 1, wherein the locking element and the holding element comprise mating detent elements, wherein the detent elements are formed so as to enable the blocking of the movement of the closure means in the direction away from the base by means of a mutual latched engagement of the detent elements.

10. The apparatus according to claim 9, wherein the mating detent elements are designed to release a movement of the closure means in the direction of the base.

11. The apparatus according to claim 1, wherein the locking element and the holding element comprise mating frictional surfaces, wherein the movement of the closure means in the direction away from the base is blocked by a static friction between the frictional surfaces.

12. The apparatus according to claim 1, further comprising a trigger on the receiving part, wherein the trigger is mechanically coupled to the closure means via a coupling, wherein the coupling is designed such that
the movability of the closure means relative to the receiving part is released upon actuation of the trigger by the device to be received in a receiving part, and
the movability of the closure means relative to the receiving part is blocked when the trigger is released by the device to be received.

13. The apparatus according to claim 12, wherein the coupling comprises a latch and a lock bolt formed in a manner complementary to the latch, wherein
the latch is arranged rotatably on the closure means and the lock bolt is arranged on the apparatus in a manner fixed to the receiving part, or
the latch is arranged rigidly on the closure means and the lock bolt is arranged rotatably on the apparatus.

14. The apparatus according to claim 13, wherein the latch or the lock bolt comprises a chamfer, wherein the chamfer is designed to transfer the latch into the lock bolt when the closure means moves in the direction away from the base.

15. The apparatus according to claim 13, wherein the trigger is arranged rotatably on the receiving part, wherein the trigger is designed, upon actuation of the trigger by the device to be received in the receiving part, to exert a force onto the latch or the lock bolt, such that the latch can be removed from the lock bolt due to the force.

16. The apparatus according to claim 1 wherein the fixing element exerts a holding force on the device when the device is held.

17. An apparatus for detachably holding a portable electronic device, wherein the apparatus comprises a receiving part for the device and a closure means, wherein the receiving part comprises a base for supporting the device, wherein the closure means is mounted so as to be movable relative to the receiving part, wherein the closure means comprises a lever and a fixing element, wherein the fixing element is arranged on a side of the receiving part opposite the base, wherein the fixing element is designed to exert a holding force in the direction of the base onto the device to be held, wherein the lever is mounted rotatably on the fixing element via a first swivel pin, wherein the apparatus further comprises a holding element fixed to the receiving part, a locking element coupled to the lever, and a stop for the locking element, said stop being rigidly connected to the fixing element, wherein the locking element is designed, at a distance from the stop, to block the movement of the closure means relative to the receiving part due to engagement with the holding element, and, when resting against the stop, to release the movement of the closure means in a direction away from the base, wherein the movable mounting of the closure means relative to the receiving part is provided via a second swivel pin, wherein the second swivel pin is designed to guide a rotational movement of the closure means relative to the receiving part.

* * * * *